United States Patent Office 3,421,295
Patented Jan. 14, 1969

3,421,295
GAS FILTERING APPARATUS
Peter Swift, Oadby, and Alfred J. Wells, Leicester, England, assignors to Dust Control Equipment Limited, Thurmaston, England
Continuation of application Ser. No. 296,977, July 23, 1963. This application May 22, 1967, Ser. No. 640,421
Claims priority, application Great Britain, July 27, 1962, 28,875/62
U.S. Cl. 55—302  5 Claims
Int. Cl. B01d 29/24

ABSTRACT OF THE DISCLOSURE

Gas filtering apparatus including a set of flat-sided filter pads, the mouths of each of which are provided with a single elongated substantially rectangular tubular outlet extending along the width of the mouth and shaped to provide a venturi. Dust-laden gas entering the apparatus is drawn through the walls of the pad, is filtered and passes therefrom via the outlet. Jets of compressed cleaning gas can, at required times, be introduced into the pads through the outlets from jet pipes located alongside the latter, to reverse the normal gas flow therethrough and clean the pads.

---

Figure 1:
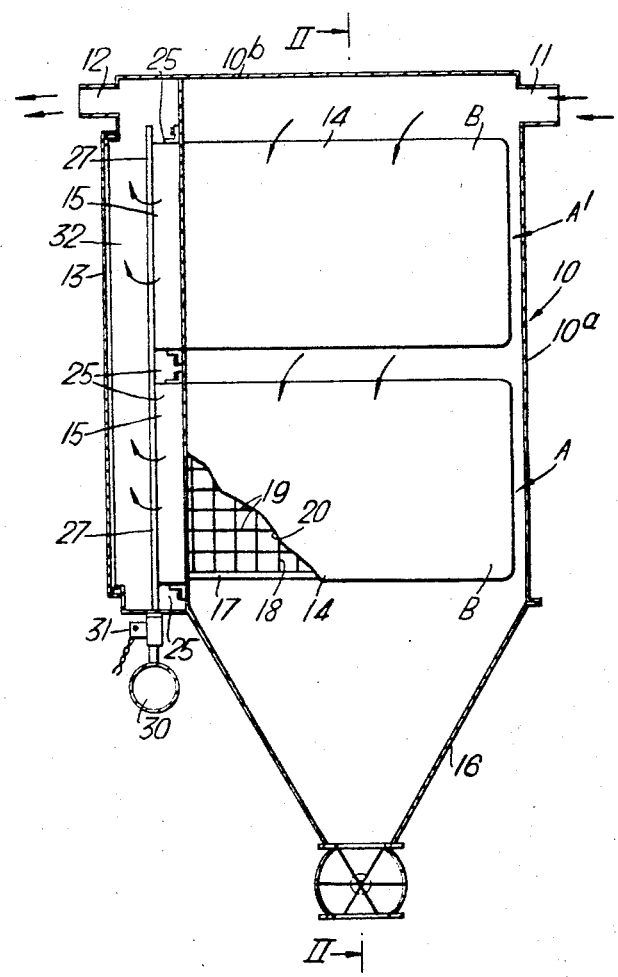

This application is a continuation of Serial Number 296,977 filed July 23, 1963 now abandoned.

This invention relates to gas filtering apparatus of the kind comprising, in combination, a casing provided with one or more inlets for dust-laden gas and at least one exhaust vent for the discharge of gas in a filtered condition, a series of flat-sided filter pads located within the casing, each of such pads including a flat, open-mouthed bag of permeable filtering medium and an insert of an open character which holds apart the sides of the said bag to keep the latter open in use and yet permits of the free passage of gas therethrough, and a jet-cleaning system adapted periodically to force a cleaning gas, for example air, from the downstream side of, and through, the permeable filtering medium of the pads to the upstream side thereof.

Moreover, the invention has reference particularly to gas filtering apparatus of this kind and of a previously proposed form in which the jet-cleaning system functions to arrest and reverse the normal flow of gas passing through the filtering medium by an abrupt and momentary introduction to the downstream faces of the said medium of compressed high energy gas having sufficient energy to immediately counteract the energy and pressure producing and normally maintaining the filtering flow.

It is principally the intention to apply the invention to dust collectors adapted for industrial use with any of various kinds of machines such as grinding, cutting, polishing, sanding and many others adopted in the engineering, chemical, food and other industries for the purpose of carrying away dust-laden air from around rotary tools and other moving components of such machines.

The adoption of the aforementioned jet-cleaning system is an efficient way of preventing filtered solids from building up on or in the filtering medium of the pads and so decreasing for permeability of the latter. In short, jet-cleaning periodically restores such permeability by removing from the permeable filtering medium at least a substantial part of the retained solids.

Heretofore, each of the filter pads in a gas filtering apparatus of the form herein referred to has been provided with at least one tubular outlet having located within it, or on the upstream side thereof, a nozzle or nozzles from which are periodically released momentary bursts of compressed cleaning gas for passage through or across the said tubular outlet into the filter pad, the position of each nozzle on the upstream side of the tubular outlet being such that the jet or jets of such gas released from the nozzle, or from any one or more or all of the nozzles associated with the outlet, reverses or reverse the flow of the ambient filtered gas on the downstream side of the said outlet so that this reversed filtered gas, in conjunction with the compressed high energy gas released from the relevant nozzle or nozzles, fills the outlet and causes a reversal of flow through the filtering medium of the pad.

In such apparatus, the filter pads usually include narrow impervious headers which are of approximately the same lateral dimension as the thickness of the pads and heretofore these headers have been so shaped and constructed as to provide or incorporate therein one or more tubular outlets within or upstream of which each compressed high energy gas nozzle for jet-cleaning was located. In one particular prior arrangement, each tubular outlet in each header was of progressively reducing cross-sectional area from its outer edge to its throat suchwise as to provide a venturi effect, and was thence of progressively increasing cross-sectional area to its inner edge which communicated directly with the interior of the corresponding filter pad.

Such prior arrangements, however, suffer from the disadvantage that, during jet-cleaning, low pressure zones tend to develop within the tops or open end portions of the filter pads, adjacent to the permeable filtering medium, as a consequence of which gas at the dusty sides, i.e. outsides, of the pads, instead of being reversed is induced to flow into the insides of the latter carrying with it some of the finer particles. The result of this, of course, is that solids still tend to be retained on the outsides of the pads in these particular regions so that permeability of the filtering medium is not completely restored during the periods of jet-cleaning, and moreover, filtering efficiency is reduced.

The primary object of the present invention is to provide, in a gas filtering apparatus of the form herein referred to, an improvement designed to obviate this localised retention and even induction of solids upon or through the filtering medium during jet-cleaning periods, so that more efficient cleaning of the filtering medium is achieved and greater overall filtering efficiency obtained.

Another object is to increase the reverse flow of ambient filtered gas on the downstream side of the filter pads so that more of such gas is inducted to flow into the pads for cleaning purposes.

According to this invention each filter pad in the improved gas filtering apparatus has a single, elongated tubular outlet of a length equal or approximately so to the width of the pad, the said outlet comprising an outer portion which throughout is substantially narrower than the thickness of the pad, and an inner portion of progressively increasing cross-sectional area which terminates at the inner edge of the outlet and communicates with the interior of the pad, the said narrow outer portion of the outlet being in the nature of a constricted throat which provides a venturi effect so that a substantial volume of reversed filtered gas is induced to flow into the outlet at each jet-cleaning period.

The invention also essentially includes the provision, at the mouth of the constricted throat portion of the outlet of each filter pad, of a jet pipe which is co-extensive with the said outlet and has provided therein a series of spaced apertures or nozzles through which periodic releases of compressed high energy gas into the pipe can flow into the pad via the outlet.

Figure 2:
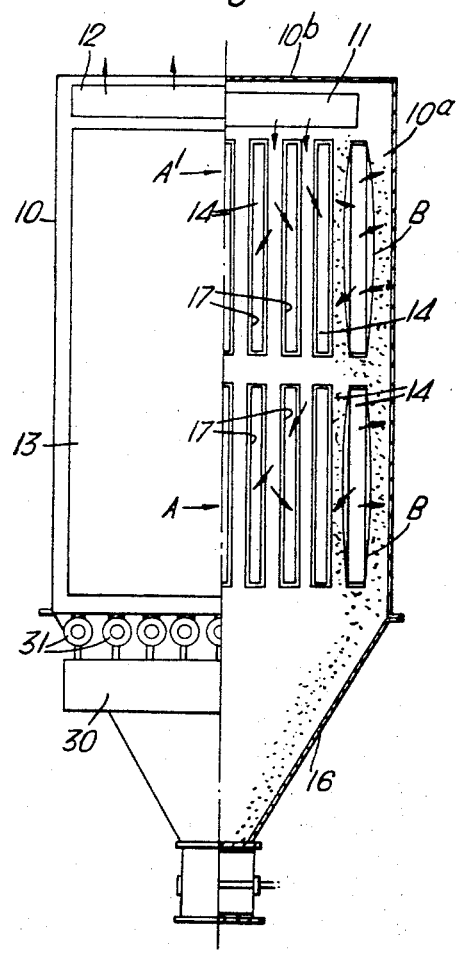
Figure 3:
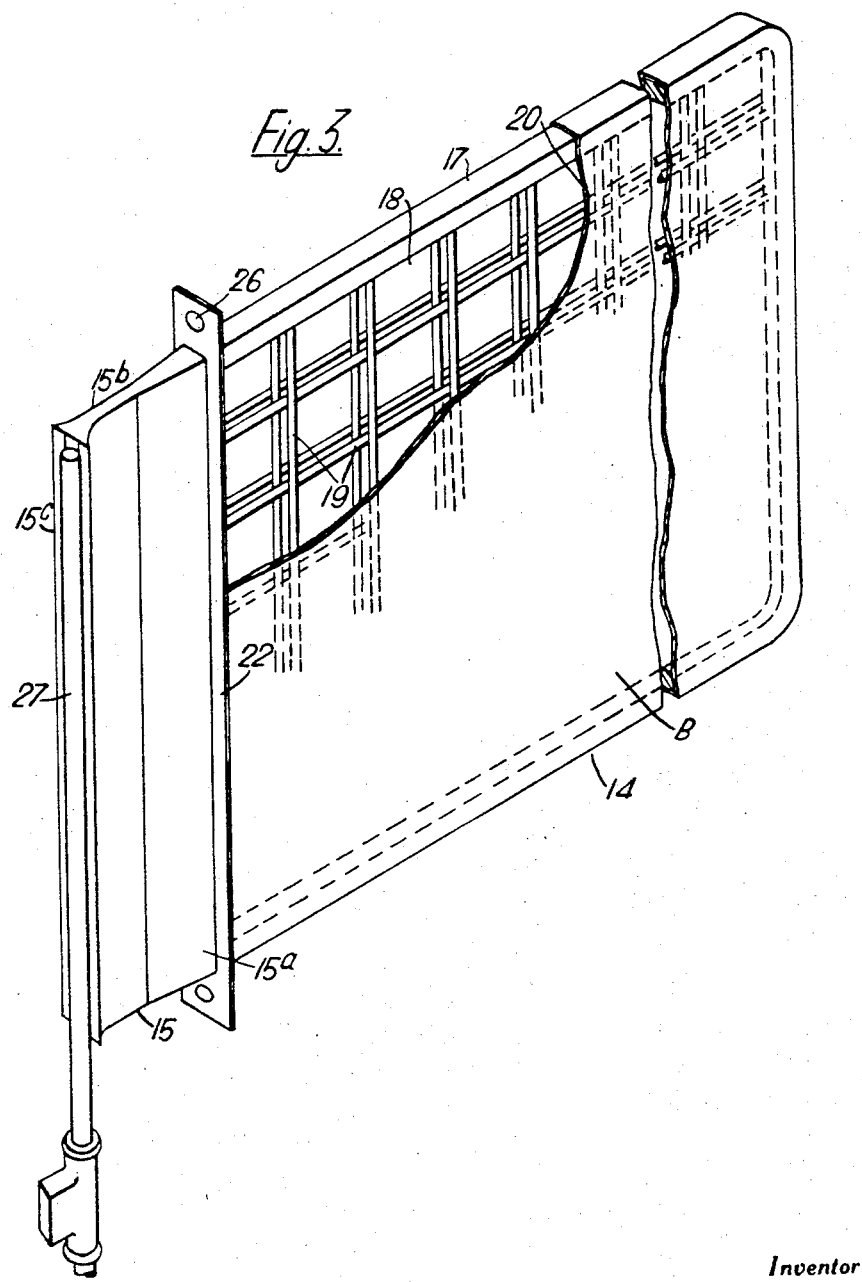

In order that the invention may be more clearly understood and readily carried into practical effect, one specific form of the improved gas filtering apparatus, and filter pads for incorporation in such an apparatus will now be described with reference to the accompanying diagrammatic drawings, wherein, FIGURE 1 is a vertical sectional view through the complete apparatus, FIGURE 2 is partly a front view, and partly a vertical section of the apparatus taken on the line 11—11 of FIGURE 1, FIGURE 3 is a general perspective view of one of the flat pads included in the said apparatus, a portion of the permeable filtering medium of the pad being torn away to disclose part of the pad insert combined with the venturi profile header.

Figures 4, 5, 6:
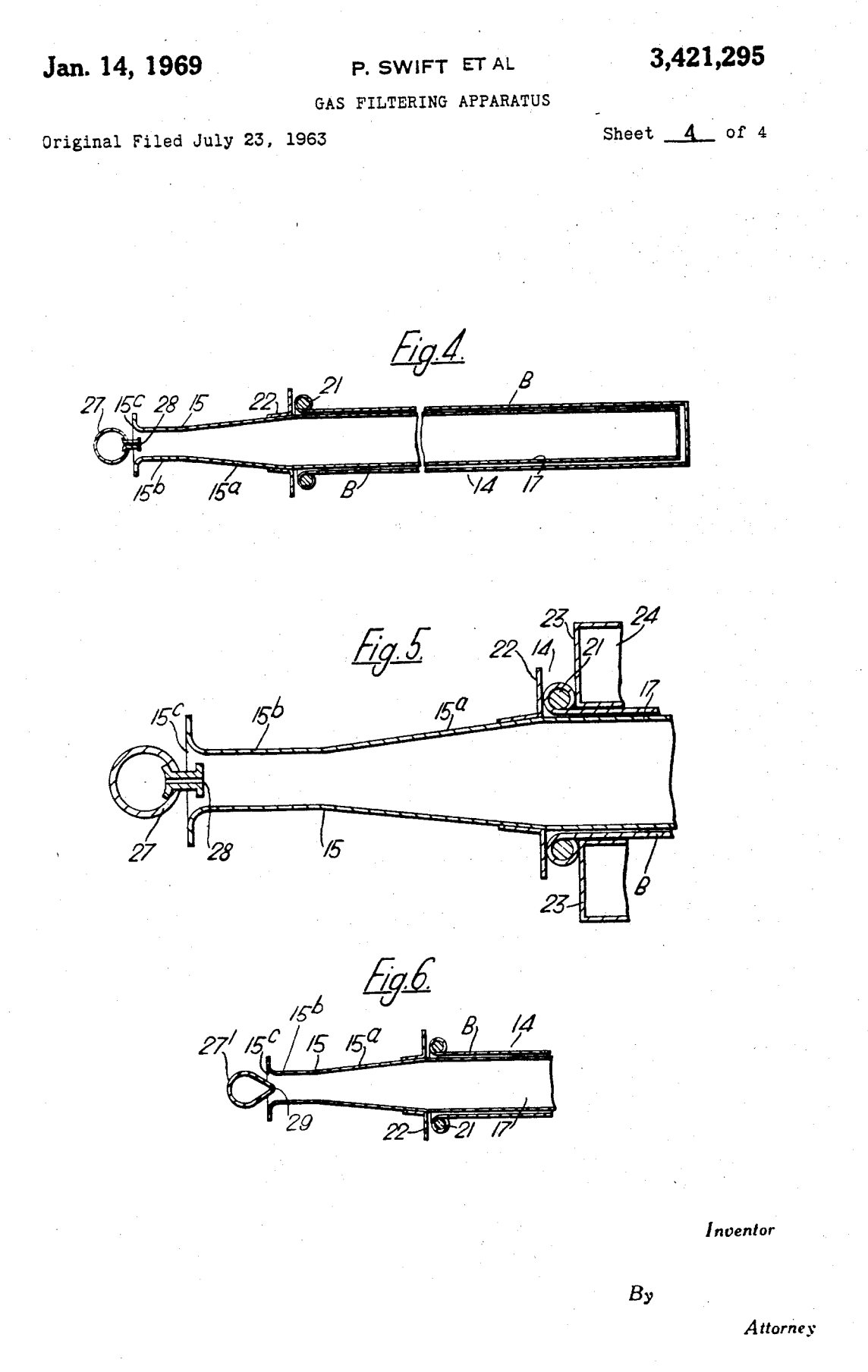

FIGURE 4 is a purely diagrammatic longitudinal sectional view through the bag, the insert and the header of the said pad, FIGURE 5 is a detail longitudinal sectional view of the said header and of the multi-jet pipe provided at the mouth thereof, and FIGURE 6 is another detail sectional view similar to FIGURE 5 illustrating a jet pipe of modified cross-section.

Like parts are designated by similar reference characters throughout the drawings.

Referring to FIGURES 1 and 2, it will be seen that the filtering apparatus comprises a casing 10 having an inlet 11 for dust-laden gas, e.g. air, and a clean gas outlet 12. The inlet 11 is provided in the closed back 10a of the casing at a location immediately adjoining the top 10b thereof. The outlet 12 is provided in the front of the casing, closely adjacent to the top 10b and above a removable or openable access door 13. In the particular apparatus illustrated, merely by way of example, there are two superimposed series or banks A and A′ of vertically disposed flat-sided filter pads 14 having single elongated tubular outlets 15 the mouths of which are contained in a common vertical plane arranged parallel to the front of the casing 10—immediately at the back of the normally closed access door 13. Dust removed from the pads 14 during jet-cleaning is collected, as depicted in FIGURE 2, in a hopper 16 combined with the bottom of the casing 10.

The single, elongated tubular outlet 15 of each flat pad 14 is in the nature of a rigid and narrow impervious header which is of a length equal or approximately so to the width of the pad. The lateral dimension of the inner portion 15a of each header 15 is approximately the same as the thickness of the corresponding pad. The insert 17 of each pad is, in this example, integrally combined with the header 15. Thus, and as illustrated more clearly in FIGURE 3, the insert 17 consists of a rigid substantially U-shaped frame serving to support a mesh or mattress 18 of intersecting straight portions 19 of suitable wire. The inner portions 15a of the headers accordingly immediately adjoin the pad inserts. The permeable filtering medium 20 of each flat pad 14 is made into the form of an open-mouthed bag B the opposite sides of which are held apart by the insert 17 which the bag contains. The mouth of the bag B is turned over to embrace an endless element 21 of compressible material which, for sealing purposes, is adapted to be clamped between a peripheral flange 22 provided on the header 15 and opposed flat surfaces such as 23 (see FIGURE 5) of a slotted support structure 24 into which the flat pads 14 are inserted. Nut and stud fastenings are provided at the locations 25 (FIGURE 1) to secure the pads in the structure 24 and effect the seals by the clamping action aforesaid. The studs pass through holes such as 26 (FIGURE 3) formed in the flanges 22 being anchored in aligned holes formed in the support structure 24.

In accordance with the characteristic feature of the present invention, the single, elongated tubular outlet 15 of each pad 14, that is to say the rigid and impervious header thereof in the illustrated example, comprises an outer portion 15b which throughout is substantially narrower than the thickness of the pad and the aforementioned inner portion 15a which is of progressively increasing cross-sectional area and terminates at the inner edge of the header where it communicates with the interior of the bag B. The narrower outer portion 15b of the header 13 is in the nature of a constricted throat which provides a venturi effect. Consequently, a substantial volume of reversed filtered gas is induced to flow into the header at each jet-cleaning period.

At the mouth 15c of the outer constricted throat portion 15b of the header 15 of each flat pad 14 there is provided a jet pipe 27 which is fully co-extensive with the header and is provided therealong with a straight row of spaced nozzles such as 28 (FIGURE 5) through which periodic releases of compressed high energy gas into the pipe can flow into the pad via its header 15.

The said mouth 15c of the constricted throat portion 15b is preferably so outwardly flared as shown in FIGURES 3, 4 and 5 as to ensure a maximum flow path of minimum resistance for the inflow of induced filtered gas during jet-cleaning. The required outward flare may conveniently be provided by outwardly flaring the outer marginal edge portions 15d of the opposed walls of the constricted throat portion 15b of the header.

The free ends of the nozzles 28 set in the jet pipe 27 are located just within the flared mouth 15c.

The apertures formed, or the nozzles 28 set, in the inner side of the jet pipe 27 are such that the jets of compressed high energy gas ejected from the pipe into the bag B of each filter pad 14 provide a uniform distribution of the said inflowing gas along the whole length of the header 15. In a case where the pipe is apertured instead of being provided with nozzles it may have formed therein a uniformly spaced longitudinal series of small holes. Alternatively, two or more longitudinally aligned elongated apertures or slots may be formed in the jet pipe for the same purpose.

The narrow outer constricted throat portion 15b of the single header outlet of each filter pad 14 may advantageously be of uniform cross-sectional area throughout, and the divergent sides of the inner portion 15a of the header of progressively increasing cross-sectional area not only assist the normal flow of filtered gas through the constricted throat but also secure some regain of the pressure lost through the throat during jet-cleaning.

The length of the elongated constricted throat portion 15b of the pad header of the improved venturi profile herein defined, even in a case where this is slightly different from the width of the filter pad, is sufficient to ensure adequate mixing of the compressed high energy gas with the reversed filtered gas induced to flow into the said header during jet-cleaning.

The elongated constricted throat portion 15b also has the advantage of spreading filtered air more uniformly through the pad header 15 during normal operation of the apparatus and thus, in turn, similarly spreads the cleaning gas load during jet-cleaning of the pad.

In one specific constructional example of the invention in which each filter pad 14 has a single elongated tubular outlet constituted by a rigid impervious header as hereinbefore described, the said header has a depth of about 5½″ and a maximum lateral dimension internally of 1⅝″; the outer constricted throat portion 15b of the header may have a depth of about 1¹¹⁄₁₆″ and an internal lateral dimension of from ³⁄₁₆″–¼″. The radius of the outwardly flared marginal portions of the opposed sides of the header is ⁵⁄₁₆″. The quoted dimensions may, however, be varied without departing from the invention.

If desired, the resistance of the flow path of the reversed filtered gas flowing into the single outlet 15 (header) of each filter pad 14 may be still further decreased by employing in conjunction with the outlet a jet pipe 27′ which, instead of being of circular cross-section, is, as depicted in FIGURE 6, of a somewhat flattened and pear-shaped or elliptical cross-section having a narrow inner side disposed in the flared mouth 15c of the outer constricted throat portion 15b. In this case the narrow inner side of the jet pipe 27' is not provided with nozzles but has formed therein a longitudinal series of spaced holes such as 29.

The compressed high energy gas periodically released into each jet pipe 27 or 27' may be contained in a bottle or an air manifold 30 (see FIGURES 1 and 2) constituting an auxiliary reservoir located at the relevant ends of the whole series of pipes, and such periodic release may be controlled by automatically actuated, e.g. solenoid valves 31. In the specific arrangement of the apparatus illustrated in FIGURE 1, each vertically disposed individual jet pipe 27 extends along the mouths 15c of two horizontally disposed but vertically aligned filter pads 14 of which one is included in the lower series or bank A and the other in the upper series or bank A'.

Instead of being horizontally disposed as shown in FIGURES 1 and 2, the filter pads 14 may be vertically disposed with their headers 15 and jet pipes 27 horizontal.

The flat filter pads 14 incorporated in the improved gas filtering apparatus are very accessible in that they can be individually withdrawn from the clean air chamber 32 of the casing 10 through the access door 13. As previously mentioned, the nut and stud fastenings at the locations 25 are sufficient to effect sealing; therefore, by having a simple union connection at the lower end of each jet pipe 27 the latter can be quickly removed and after unscrewing the relevant nut and bolt fastenings the corresponding pads can be wholly withdrawn from the casing 10.

The use of filter pads arranged as shown results in a considerable improvement of gas flow through the filter. The incoming dust-laden gas is split between adjacent pads 14 as depicted by the arrows at the right-hand side in FIGURE 2, thereby reducing eddy currents and turbulence to a minimum. This feature constitutes a general improvement over a stocking type filter where the inlet is normally at the base of the filter and the gas is left to find its own way through the stockings, resulting in intense turbulence and, in consequence, a far larger proportion of dust adheres to such stockings. This flow-straightening obtainable in a pad type filter provides the best advantage when the dust-laden gas inlet is situated above the pads as it is in the apparatus illustrated in FIGURES 1 and 2. The heavier particles of dust fall under the influence of gravity into the hopper 16 being assisted in this fall by the downward flow of gas through the pads.

The pads 14, being self-supporting because the inserts 17 are made integrally with the venturi profile headers 15, may be mounted in any desired positions. This is a particular advantage in the case of a filter used for venting a silo or similar receiving bin; a filter cell comprising a number of flat pads can be inserted directly into the top or side of the silo.

We claim:

1. A gas filtering apparatus comprising, in combination, a casing having at least one inlet for dust-laden gas and at least one outlet spaced from said inlet for discharge of gas in a filtered condition; a set of flat-sided pads located within said casing, each pad having a width several times the thickness thereof, and each including a flat-sided open-mouthed bag of permeable filtering medium and means for maintaining said bag in a flat-sided configuration; means for preventing gas from by-passing said pads; each of said filter pads having in the mouth thereof a single elongated substantially rectangular in cross-section venturi-type tubular outlet extending outwardly of the mouth of the pad and being throughout its length of a width equal to the width of the pad and extending along the width of the mouth of the pad; means for supporting said tubular outlets; said tubular outlets comprising an outer portion comprising a first portion of extent in a direction parallel to the longitudinal axis of said outlet and perpendicular to the width of the outlet, of constant cross-sectional area throughout said extent and of narrower cross-section than the thickness of the mouth of the filter pad, and a second portion located outwardly of said first portion and outwardly flared in cross-section to ensure a maximum flow-path of minimum resistance for the inflow of the induced filtered gas during jet cleaning, and an inner portion of progressively increasing cross-sectional area which terminates at an inner edge of the outlet where it communicates with the interior of the pad, the thickness of said inner portion at the point of communication with the interior of the pad being equal to the thickness of the pad; and jet cleaning means comprising a jet pipe located at the second portion of the outer portion of the tubular outlet of each filter pad, said pipe being disposed alongside said outlet and having provided therein a longitudinal series of spaced jet openings positioned within the confines of the outlet and directed towards the pad; and means effecting the periodic release of compressed high energy cleaning gas into the pipe for flow into the corresponding pad through its tubular outlet suchwise as to arrest and reverse the normal flow of filtered gas a substantial volume of which is induced to flow into the outlet at each jet cleaning period, wherein said first portion of constant cross-section of said tubular outlet serves as a mixing chamber to ensure adequate mixing of the compressed cleaning gas with the reversed filtered gas induced to flow into said outlet during cleaning, and wherein formation of low pressure zones within the filter pads during cleaning is combatted.

2. A gas filtering apparatus according to claim 1, wherein each open-mouthed bag has located therein said means for maintaining said bag in a flat-sided configuration, said means comprising an insert of an open character for holding apart the sides of the latter, and thus permitting of the free passage of gas therethrough, said insert being integrally combined with a rigid and impervious tubular header which constitutes said tubular outlet.

3. A gas filtering apparatus according to claim 1, wherein the means for effecting the periodic release of compressed high energy cleaning gas comprises a manifold constituting a reservoir for compressed high energy cleaning gas and which is connected with relevant ends of the series of jet pipes, and automatically operable valves for effecting and controlling periodic release of such high energy cleaning gas from said manifold into said pipes for flow into the pads through their tubular outlets suchwise as to arrest and reverse the normal flow of filtered gas a substantial volume of which is induced to flow into the outlets at each jet cleaning period.

4. A gas filtering apparatus according to claim 1, wherein the said jet openings comprise nozzles.

5. A gas filtering apparatus according to claim 4, wherein the free ends of the spaced nozzles of each jet tube are located just within the flared mouth of the single outlet of the corresponding filter pad.

References Cited

UNITED STATES PATENTS

| 1,012,122 | 12/1911 | Budil | 55—341 |
| 1,818,736 | 8/1931 | Moore | 55—304 |
| 2,804,168 | 8/1957 | Church | 55—302 |
| 2,906,371 | 9/1959 | Jones | 55—294 |
| 3,073,097 | 1/1963 | Hallett et al. | 55—302 |

FOREIGN PATENTS

| 225,059 | 10/1959 | Australia. |
| 229,897 | 8/1960 | Australia. |
| 1,284,449 | 1/1962 | France. |
| 1,289,019 | 2/1962 | France. |
| 125,118 | 4/1960 | U.S.S.R. |

HARRY B. THORNTON, *Primary Examiner.*

BERNARD NOZICK, *Assistant Examiner.*

U.S. Cl. X.R.

55—341, 484